United States Patent
Yi

(10) Patent No.: US 9,857,510 B2
(45) Date of Patent: Jan. 2, 2018

(54) DISPLAY DEVICE AND METHOD OF MANUFACTURING THE SAME

(71) Applicant: Samsung Display Co., Ltd., Yongin, Gyeonggi-Do (KR)

(72) Inventor: Tong Su Yi, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 301 days.

(21) Appl. No.: 13/966,046

(22) Filed: Aug. 13, 2013

(65) Prior Publication Data
US 2014/0153100 A1 Jun. 5, 2014

(30) Foreign Application Priority Data
Dec. 3, 2012 (KR) .................. 10-2012-0139048

(51) Int. Cl.
| | |
|---|---|
| *G02B 27/00* | (2006.01) |
| *G02B 5/22* | (2006.01) |
| *G02F 1/1333* | (2006.01) |
| *G02F 1/1335* | (2006.01) |

(52) U.S. Cl.
CPC ........ *G02B 5/223* (2013.01); *G02F 1/133308* (2013.01); *G02F 1/133512* (2013.01)

(58) Field of Classification Search
CPC ......... G02F 1/133308; G02F 1/133512; G02F 2001/133331; G06F 3/041; G06F 1/16; G06F 1/133512; G06F 2001/133388; G06F 2201/08; G06F 2203/04107
USPC .................. 359/601, 609; 349/110
See application file for complete search history.

(56) References Cited

U.S. PATENT DOCUMENTS

| | | | | |
|---|---|---|---|---|
| 6,498,672 B2 * | 12/2002 | Saitoh | ............... | G02F 1/133308 349/149 |
| 7,830,595 B2 * | 11/2010 | Hinata | .............. | G02F 1/133308 359/245 |
| 7,969,539 B2 * | 6/2011 | Sakurai | ............. | G02F 1/133308 349/110 |
| 2004/0141112 A1 | 7/2004 | Kang | | |
| 2006/0082717 A1 | 4/2006 | Han | | |
| 2009/0310216 A1 * | 12/2009 | Roh | ........................ | G02B 27/26 359/465 |

(Continued)

FOREIGN PATENT DOCUMENTS

| | | |
|---|---|---|
| CN | 1763600 | 4/2006 |
| CN | 101782827 | 7/2010 |

(Continued)

*Primary Examiner* — Thomas K Pham
*Assistant Examiner* — Nicholas R Pasko
(74) *Attorney, Agent, or Firm* — H.C. Park & Associates, PLC

(57) ABSTRACT

A display device includes a window panel including a display area and a non-display area including a first non-display area and a second non-display area and a display panel including a pixel area generating an image to be displayed in the display area and a non-pixel area surrounding the pixel area. The window panel includes a window glass, decoration printed layers disposed on the window glass in the first and second non-display areas, and a light-blocking printed layer disposed on the window glass and the decoration printed layers to cover the decoration printed layers in the first non-display area and having a black color. A boundary line corresponding to a boundary between the display area and the non-display area is an inner surface of the light-blocking printed layer and the display area corresponds to the pixel area at the boundary line.

19 Claims, 9 Drawing Sheets

(56) References Cited

U.S. PATENT DOCUMENTS

| | | | |
|---|---|---|---|
| 2010/0182267 A1* | 7/2010 | Lee | G06F 3/044 345/173 |
| 2011/0242057 A1* | 10/2011 | Lee | G06F 3/041 345/176 |
| 2012/0008191 A1 | 1/2012 | Lim et al. | |
| 2012/0026107 A1* | 2/2012 | Kim | G06F 3/044 345/173 |
| 2012/0050225 A1* | 3/2012 | Chou | G06F 3/041 345/175 |
| 2012/0075838 A1* | 3/2012 | Lee | G02F 1/133308 362/97.1 |
| 2012/0113032 A1* | 5/2012 | Itakura | G06F 3/044 345/173 |
| 2012/0170283 A1* | 7/2012 | Kobayashi | G06F 3/041 362/351 |
| 2013/0082961 A1* | 4/2013 | Wang | G06F 3/044 345/173 |
| 2014/0063361 A1* | 3/2014 | Lo | G06F 1/16 349/12 |

FOREIGN PATENT DOCUMENTS

| | | |
|---|---|---|
| CN | 102629033 | 8/2012 |
| CN | 202404554 U * | 8/2012 |
| CN | 102667688 | 9/2012 |
| JP | 2009-251550 | 10/2009 |
| KR | 20-2011-0008715 U | 9/2011 |
| KR | 10-2011-0110562 A | 10/2011 |
| KR | 10-2012-0010828 A | 2/2012 |
| KR | 10-2012-0060962 A | 6/2012 |
| TW | 201222122 | 6/2012 |

\* cited by examiner

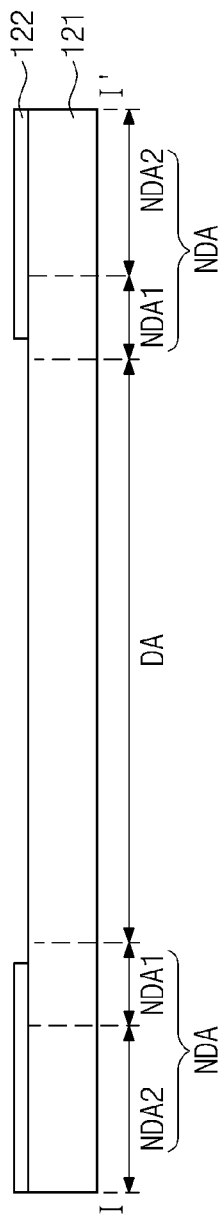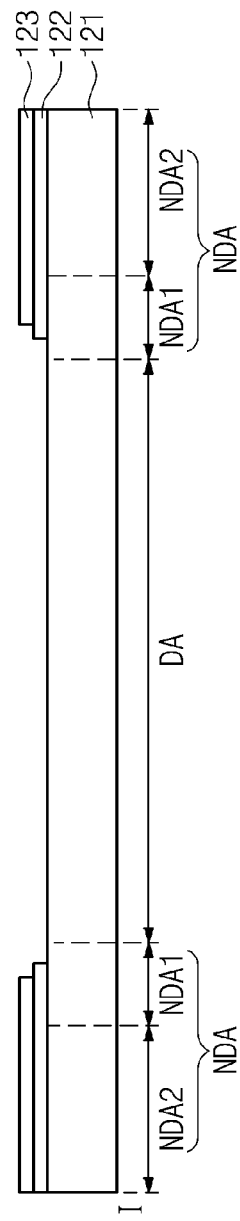

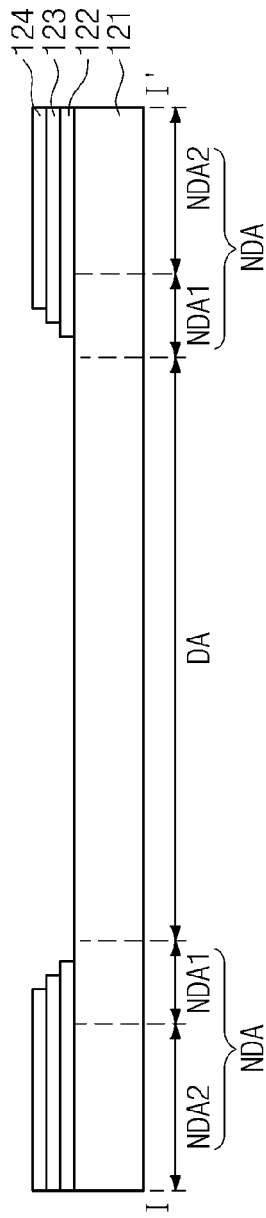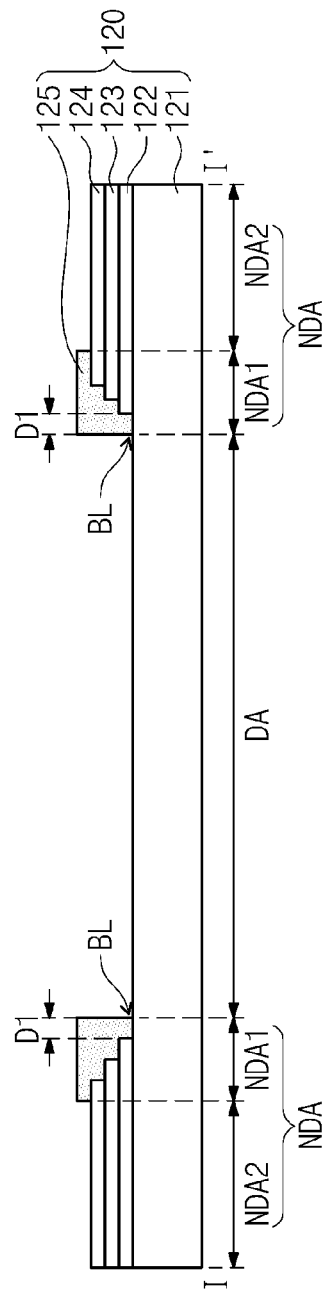

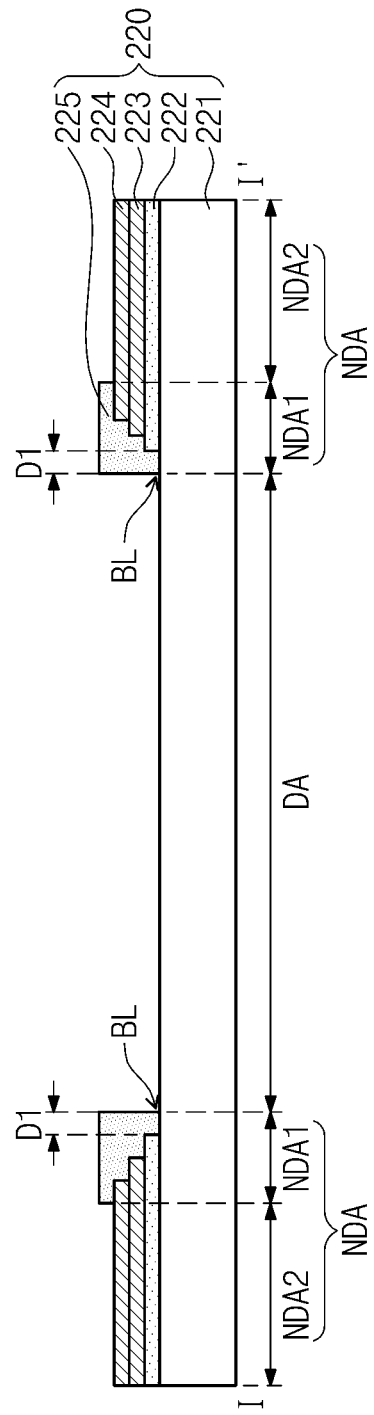

DISPLAY DEVICE AND METHOD OF MANUFACTURING THE SAME

CLAIM OF PRIORITY

This application makes reference to, incorporates the same herein, and claims all benefits accruing under 35 U.S.C. §119 from an application earlier filed in the Korean Intellectual Property Office on Dec. 3, 2012 and duly assigned Serial No. 10-2012-0139048.

BACKGROUND OF THE INVENTION

Field of the Invention

Embodiments of the present invention generally relate to a display device and a method of manufacturing the display device, and more particularly, to a display device capable of minimizing a boundary recognition error between a display area and a non-display area of the display device and a method of manufacturing the display device.

Description of the Related Art

Various electronic devices, such as a mobile communication terminal, a digital camera, a notebook computer, a monitor, a television set, etc., require a display device to display an image.

The display device includes a display panel that displays an image and a window panel disposed on the display panel to protect the display panel. To make the display panel, various panels, e.g., a liquid crystal display panel, an organic light emitting display panel, an electrowetting display panel, a plasma display panel, an electrophoretic display panel, etc., have been developed. The display panel may have a touch panel function.

The window panel is attached to an upper portion of the display panel. The image generated by the display panel is provided to a viewer through the window panel.

SUMMARY OF THE INVENTION

Embodiments of the present invention provide a display device capable of minimizing a boundary recognition error between a display area and a non-display area.

Embodiments of the present invention provide a method of manufacturing the display device.

Embodiments of the present invention provide a display device including a window panel that includes a display area and a non-display area including a first non-display area surrounding the display area and a second non-display area surrounding the first non-display area and a display panel that includes a pixel area generating an image to be displayed in the display area and a non-pixel area surrounding the pixel area. The window panel includes a window glass, a plurality of decoration printed layers disposed on the window glass in a portion of the first non-display area and an entire of the second non-display area, and a light-blocking printed layer disposed on the window glass and the decoration printed layers to cover the decoration printed layers in the first non-display area and having a black color. A boundary line corresponding to a boundary between the display area and the non-display area is an inner surface of the light-blocking printed layer, and the display area geometrically corresponds to the pixel area along the boundary line.

The decoration printed layers include a first decoration printed layer disposed on the window glass, a second decoration printed layer disposed on the first decoration printed layer, and a third decoration printed layer disposed on the second decoration printed layer. The first decoration printed layer is spaced apart from the boundary line by a predetermined distance and disposed on the window glass in the portion of the first non-display area and the entire of the second non-display area.

A left-right width of the first decoration printed layer is larger than a left-right width of the second decoration printed layer, and the left-right width of the second decoration printed layer is larger than a left-right width of the third decoration printed layer.

The first decoration printed layer is disposed to be more adjacent to the display area than the second decoration printed layer, and the second decoration printed layer is disposed to be more adjacent to the display area than the third decoration printed layer.

The first, second, and third decoration printed layers have a same color except for the black color.

The first decoration printed layer includes a pearl pigment that glitters and has a transparent color, and the second and third decoration printed layers have a color different from the color of the first decoration printed layer and have the same color except for the black color.

A distance between the boundary line and an inner surface of the first decoration printed layer is in a range from about 0.2 mm to about 0.5 mm.

Embodiments of the present invention provide a method of manufacturing a display device including preparing a window glass including a display area and a non-display area including a first non-display area surrounding the display area and a second non-display area surrounding the first non-display area, forming a plurality of decoration printed layers on the window glass in a portion of the first non-display area and an entire of the second non-display area, forming a light-blocking printed layer, which has a black color, on the window glass and the decoration printed layers to cover the decoration printed layers in the first non-display area, disposing a display panel including a pixel area generating an image to be displayed in the display area and a non-display area surrounding the pixel area and the display panel being attached with an adhesive member under the window glass, irradiating a light onto the window glass from above the window glass to recognize a boundary line corresponding to an inner surface of the light-blocking printed layer and being defined as a boundary between the display area and the non-display area, arranging the pixel area to correspond to the display area at the boundary line, and attaching the display panel and the window glass to each other using the adhesive member.

The forming of the decoration printed layers includes forming a first decoration printed layer on the window glass, forming a second decoration printed layer on the first decoration printed layer, forming a third decoration printed layer on the second decoration printed layer. The first decoration printed layer is spaced apart from the boundary line by a predetermined distance and formed on the window glass in the portion of the first non-display area and the entire of the second non-display area.

The first decoration printed layer has a left-right width larger than a left-right width of the second decoration printed layer, the second decoration printed layer has the left-right width larger than a left-right width of the third decoration printed layer, the first decoration printed layer is disposed to be more adjacent to the display area than the second decoration printed layer, and the second decoration printed layer is disposed to be more adjacent to the display area than the third decoration printed layer.

According to the above, the display device and the method of manufacturing the display device may provide an improved boundary recognition ability and minimize a boundary recognition error between the display area and the non-display area.

BRIEF DESCRIPTION OF THE DRAWINGS

The above and other advantages of the present invention will become readily apparent by reference to the following detailed description when considered in conjunction with the accompanying drawings wherein:

FIGS. 3A through 3G are cross-sectional views showing a method of manufacturing a display device constructed as an embodiment according to the principles of the present invention;

FIG. 4 is a cross-sectional view showing a window panel of a display device constructed as another embodiment according to the principles of the present invention.

DETAILED DESCRIPTION OF THE INVENTION

Figure 1:
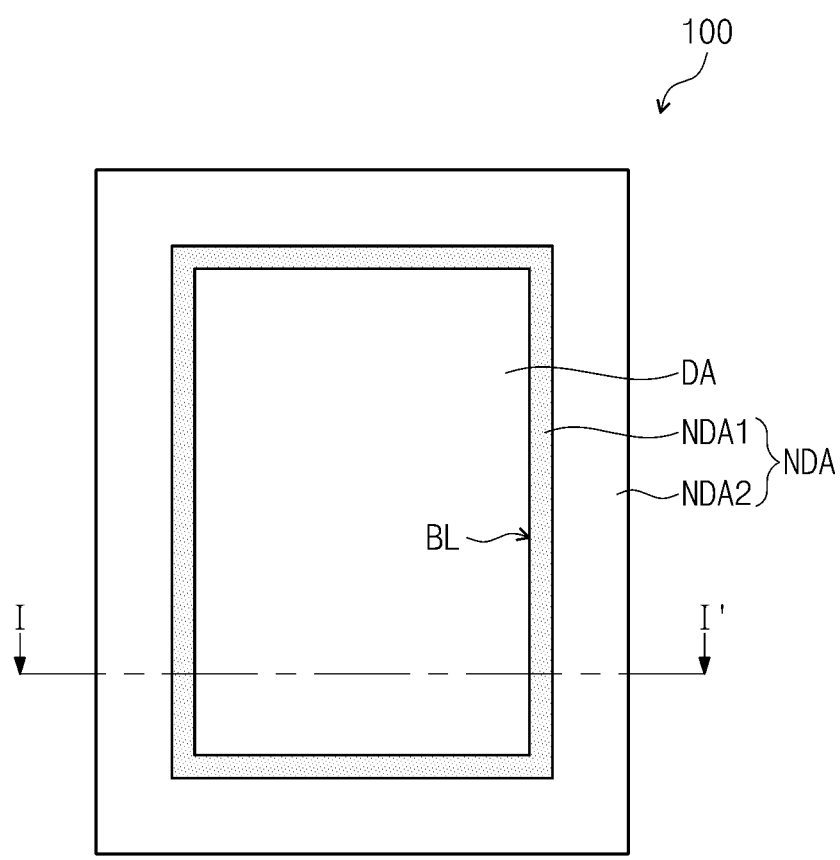
FIG. 1 is a plan view showing a display device constructed as an embodiment according to the principles of the present invention when viewed in a top-down view.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a plan view showing a display device constructed as an embodiment according to the principles of the present invention when viewed in a top-down view.

Referring to FIG. 1, a display device 100 includes an upper surface divided into a display area DA and a non-display area NDA surrounding the display area DA. The display area DA displays an image provided to a viewer and the non-display area NDA does not display the image. The upper surface of the display device 100 shown in FIG. 1 corresponds to an upper surface of a window panel, and this will be described with reference to FIG. 2. Additionally, an upper surface of the present invention refers to a major surface facing a viewer who views an image/video displayed on the display device 100.

The non-display area NDA includes a first non-display area NDA1 surrounding the display area DA and a second non-display area NDA2 surrounding the first non-display area NDA1. The first non-display area NDA1 is printed in a black color. The second non-display area NDA2 is printed in various colors except for the black color. For instance, the second non-display area NDA2 may be printed in a white color, but it should not be limited to the white color.

A boundary between the display area DA and the non-display area NDA is referred to a boundary line BL. The boundary line BL corresponds to a portion of a surface at which the display area DA meets the non-display area NDA. The boundary line BL may be referred to as an inner surface of the first non-display area NDA1. Additionally, an inner surface of the present invention refers to a minor side surface facing the display area DA.

Figure 2:
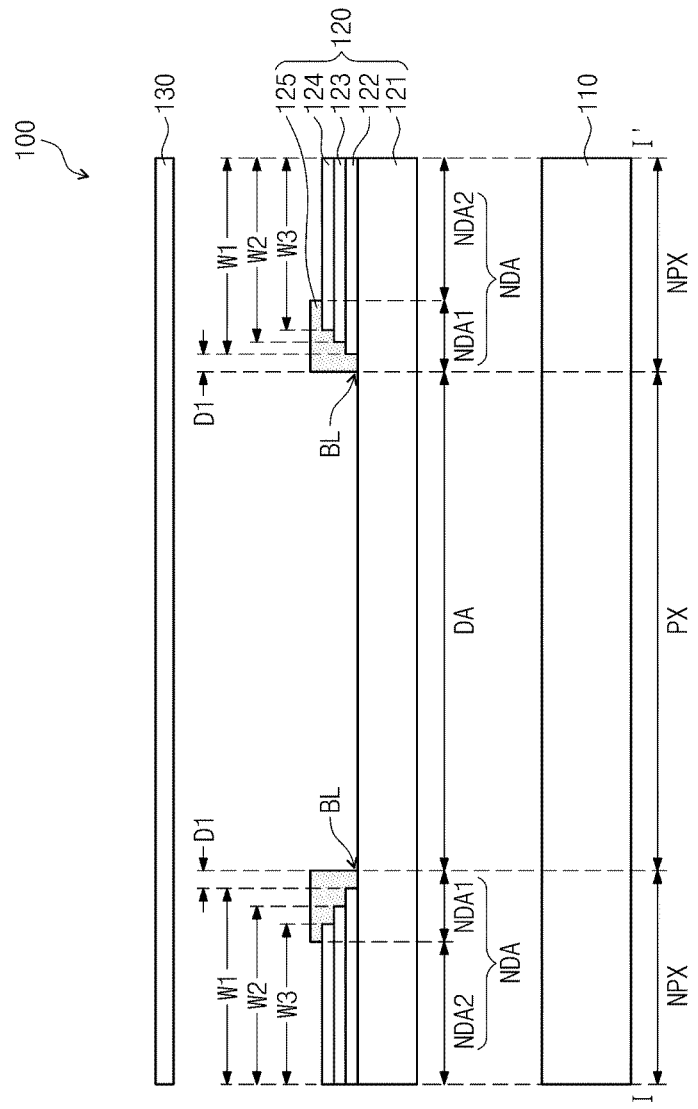
FIG. 2 is a cross-sectional view taken along line I-I' shown in FIG. 1.

FIG. 2 is a cross-sectional view taken along line I-I' shown in FIG. 1.

Referring to FIG. 2, the display device 100 includes a display panel 110 in which a pixel area PX and a non-pixel area NPX are defined, a window panel 120 in which the display area DA and the non-display area NDA are defined, and a protective film 130. The window panel 120 is disposed on the display panel 110 and the protective film 130 is disposed on the window panel 120. In addition, the display device 100 may include an adhesive member (not shown in FIG. 2) disposed between the window panel 120 and the display panel 110 to attach the window panel 120 and the display panel 110 to each other. Although a major surface of the protective film 130 shown in FIG. 2 is flat, the major surface of the protective film 130 may have a different topographic surface after the protective film has been attached onto the window panel 120.

The non-pixel area NPX is disposed adjacent to the pixel area PX and the non-display area NDA is disposed adjacent to the display area DA. The pixel area PX of the display panel 110 corresponds to the display area DA of the window panel 120 and the non-pixel area NPX of the display panel 110 corresponds to the non-display area NDA of the window panel 120. In FIG. 2, for the convenience of explanation, the display panel 110, the window panel 120, and the protective film 130 are separated from each other.

The pixel area PX of the display panel 110 generates and displays the image and the non-pixel area NPX does not generate the image. Although not shown in FIG. 2, the display panel 110 includes a plurality of pixels in the pixel area PX and a driver in the non-pixel area NPX to drive the pixels. The pixels are driven by the driver and displays desired images.

The window panel 120 includes a window glass 121, a plurality of decoration printed layers 122, 123, and 124, and a light-blocking printed layer 125. The window glass 121 has a transparent property to transmit light therethrough.

As described above, the non-display area NDA includes the first non-display area NDA1 and the second non-display area NDA2. The decoration printed layers 122, 123, and 124 and the light-blocking printed layer 125 are disposed on the window glass 121 in the non-display area NDA. In detail, the decoration printed layers 122, 123, and 124 are disposed on the window glass 121 in a portion of the first non-display area NDA1 and the entire of the second non-display area NDA2. The light-blocking printed layer 125 is disposed in the first non-display area NDA1. The light-blocking printed layer 125 is disposed on the window glass 121 and the decoration printed layers 122, 123, and 124 to cover the decoration printed layers 122, 123, and 124 in the first non-display area NDA1. The light-blocking printed layer 125 may not cover the decoration printed layers 122, 123, and 124 in the second non-display area NDA2 so that the decoration printed layers 122, 123, and 124 in the second non-display area NDA2 may be visible to the viewer.

The boundary between the display area DA and the non-display area NDA is determined at the inner surface of the light-blocking printed layer 125. That is, the boundary line BL indicating the boundary between the display area DA and the non-display area NDA corresponds to the inner surface of the light-blocking printed layer 125.

The decoration printed layers 122, 123, and 124 and the light-blocking printed layer 125 are formed of an organic material having a predetermined color. The decoration printed layers 122, 123, and 124 may have the same colors. The decoration printed layers 122, 123, and 124 may have colors except for the black color. For instance, the decoration printed layers 122, 123, and 124 may have the white color, but the decoration printed layers 122, 123, and 124 should not be limited to the white color. That is, the decoration printed layers 122, 123, and 124 have the same color except for the white color.

The light-blocking printed layer 125 has the black color. Accordingly, the first non-display area NDA1 of the window panel 120 displays the black color and the second non-display area NDA2 of the window panel 120 displays a predetermined color except for the black color. Hereinafter, the configuration of the window panel 120 will be described on the assumption that the decoration printed layers 122, 123, and 124 have the white color.

The decoration printed layers 122, 123, and 124 includes a first decoration printed layer 122 disposed on the window glass 121, a second decoration printed layer 123 disposed on the first decoration printed layer 122, and a third decoration printed layer 124 disposed on the second decoration printed layer 123. The first decoration printed layer 122 is spaced apart from the boundary line BL by a predetermined distance, and thus the first decoration printed layer 122 is disposed in the portion of the first non-display area NDA1 and the entire of the second non-display area NDA2.

A left-right width W1 of the first decoration printed layer 122 is larger than a left-right width W2 of the second decoration printed layer 123. The first decoration printed layer 122 is disposed more adjacent to the display area DA than the second decoration printed layer 123. The left-right width W2 of the second decoration printed layer 123 is larger than a left-right width W3 of the third decoration printed layer 124. The second decoration printed layer 123 is disposed more adjacent to the display area DA than the third decoration printed layer 124.

The first, second, and third decoration printed layers 122, 123, and 124 have the white color. The white color may be more clearly seen when plural decoration printed layers having the white color are disposed on the window glass 121 than when one decoration printed layer having the white color is disposed on the window glass 121. Due to the first, second, and third decoration printed layers 122, 123, and 124, the white color is displayed in the second non-display area NDA2. FIG. 2 shows three decoration printed layers 122, 123, and 124, but the number of the decoration printed layers should not be limited to three.

The light-blocking printed layer 125 is disposed on the window glass 121 and the first, second, and third decoration printed layers 122, 123, and 124 in the first non-display area NDA1 to cover the first, second, and third decoration printed layers 122, 123, and 124 in the first non-display area NDA1. A distance between the inner surface of the light-blocking printed layer 125 and the inner surface of the first decoration printed layer 122 is referred to as a first distance D1. That is, a distance between the boundary line BL and the inner surface of the first decoration printed layer 122 is referred to as the first distance D1. The first distance D1 is referred to as width having a minimum margin to entirely cover the first, second, and third decoration printed layers 122, 123, and 124 in the first non-display area NDA1. For example, the first distance D1 is in a range from about 0.2 mm to about 0.5 mm.

The protective film 130 may be a transparent film to transmit light. Thus, the image generated in the pixel area PX of the display panel 110 is provided to the viewer after passing through the display area DA of the window glass 121 and the protective film 130.

The black and white colors are provided to the viewer in the first and second non-display areas NDA1 and NDA2 of the window panel 120. The non-pixel area NPX of the display panel 110 geometrically corresponds to the non-display area NDA of the window panel 120. Therefore, the driver disposed in the non-pixel area NPX of the display panel 110 is visually blocked by the light-blocking printed layer 125 and the first, second, and third decoration printed layers 122, 123, and 124, which are disposed in the non-display area NDA of the window panel 120, and thus the viewer does not see the driver.

Preferably, when the display device 100 is manufactured, the display panel 110 and the window panel 120 are arranged such that the pixel area PX of the display panel 110 is located to geometrically correspond to the display area DA of the window panel 120. However, in a case that the pixel area PX of the display panel 110 does not geometrically correspond to the display panel DA of the window panel 120, the image generated in the pixel area PX of the display panel 110 is partially blocked by the non-display area NDA of the window panel 120 and the blocked portion of the image is not provided to the viewer.

To arrange the pixel area PX of the display panel 110 to geometrically correspond to the display area DA of the window panel 120, the light is irradiated onto the window panel 120 to recognize the boundary line BL between the display area DA and the non-display area NDA. For instance, when the light is irradiated onto the window panel 120, the light-blocking printed layer 125 blocks the light and the window glass 121 transmits the light in the display area DA. Thus, the inner surface of the light-blocking printed layer 125 is clearly displayed as the boundary line BL. That is, the boundary line BL is clearly recognized by the light-blocking printed layer 125. Therefore, the pixel area PX of the display panel 110 may be arranged to geometrically correspond to the display area DA of the window panel 120 by using the boundary line BL.

However, the light-blocking printed layer 125 may not entirely cover the first, second, and third decoration printed layers 122, 123, and 124 in the first non-display area NDA1. As an example, the light-blocking printed layer 125 does not entirely cover the first decoration printed layer 122 in the first non-display area NDA1 and the inner surface of the first decoration printed layer 122 is set as the boundary line. The first decoration printed layer 122 has a light transmittance higher than that of the light-block printed layer 125 since the first decoration printed layer 122 has the white color. In this case, when the light is irradiated onto the window panel 120, the inner surface of the first decoration printed layer 122 may not be recognized as the boundary line due to the high light transmittance of the first decoration printed layer 122.

When the boundary line is not clearly recognized, the position of the pixel area PX of the display panel 110 may not geometrically correspond to the position of the display area DA of the window panel 120 after the display panel 100 is manufactured. In the case that the first, second, and third decoration printed layers 122, 123, and 124 have the other colors except for the black color, the inner surface of the first decoration printed layer 122 may not be recognized as the boundary line.

In the present exemplary embodiment, the light-blocking printed layer 125 of the display device 100 is disposed on the window glass 121 and the first, second, and third decoration printed layers 122, 123, and 124 to cover the first, second, and third decoration printed layers 122, 123, and 124 in the first non-display area NDA1 and has the black color. The light-blocking printed layer 125 having the black color has a light blocking ratio higher than that of the first, second, and third decoration printed layers 122, 123, and 124. Due to the above-mentioned configuration, the inner surface of the light-blocking printed layer 125 may be clearly displayed as the boundary line BL.

Consequently, the display device 100 according to the present exemplary embodiment may provide an improved boundary recognition ability and minimize a boundary recognition error between the display area DA and the non-display area NDA.

Figure 5:
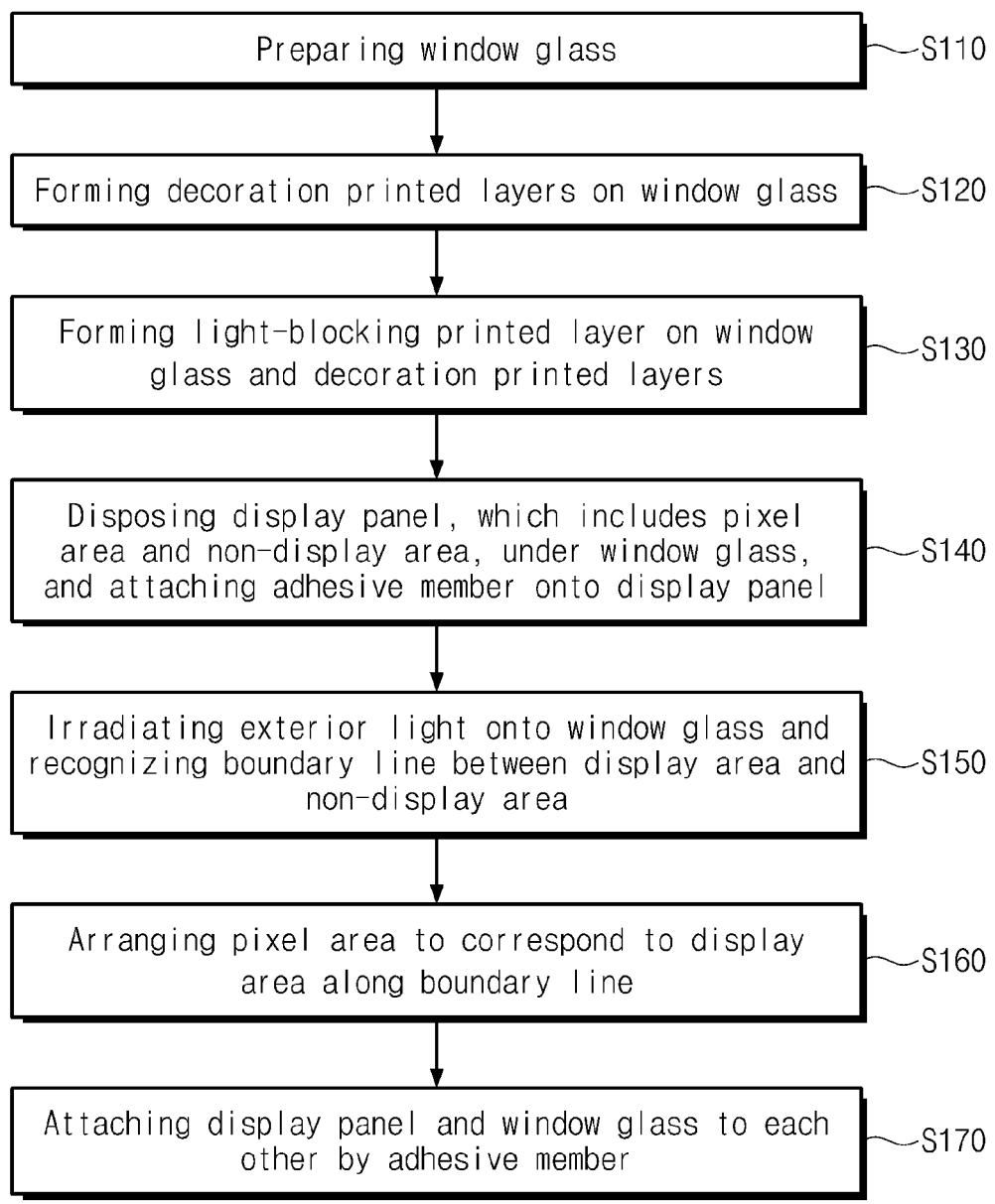
FIG. 5 is a flowchart showing a method of manufacturing a display device.

FIGS. 3A through 3G are cross-sectional views showing a method of manufacturing a display device constructed as an embodiment according to the principles of the present invention. FIG. 5 is a flowchart showing a method of manufacturing a display device.

Referring to FIGS. 3A through 3C and FIG. 5, the window glass 121, in which the display area DA and the non-display area NDA including the first and second non-display areas NDA1 and NDA2 are defined, is first prepared at step S110. And then, the first, second, and third decoration printed layers 122, 123, and 124 are formed on the window glass 121 in the portion of the first non-display area NDA1 and the entire of the second non-display area NDA2 at step S120.

In detail, the first decoration printed layer 122 is formed on the window glass 121 in the portion of the first non-display area NDA1 and the entire of the second non-display area NDA2 and spaced apart from the boundary area between the display area DA and the non-display area NDA.

The second decoration printed layer 123 is formed on the first decoration printed layer 122, and the second decoration printed layer 123 has the left-right width narrower than that of the first decoration printed layer 122. The third decoration printed layer 124 is formed on the second decoration printed layer 123 and has the left-right width narrower than that of the second decoration printed layer 123. The first decoration printed layer 122 is formed to be more adjacent to the display area DA than the second decoration printed layer 123. The second decoration printed layer 123 is formed to be more adjacent to the display area DA than the third decoration printed layer 124.

Referring to FIG. 3D and FIG. 5, at step S130, the light-blocking printed layer 125 is formed on the window glass 121 and the first, second, and third decoration printed layers 122, 123, and 124 to cover the first, second, and third decoration printed layers 122, 123, and 124 in the first non-display area NDA1. As described above, the inner surface of the light-blocking printed layer 125 may be defined as the boundary line BL. The first distance D1 between the inner surface of the light-blocking printed layer 125 and the first decoration printed layer 122 is in the range from about 0.2 mm to about 0.5 mm.

The window panel 120 may be manufactured by the method shown in FIGS. 3A through 3D.

Figure 3E:
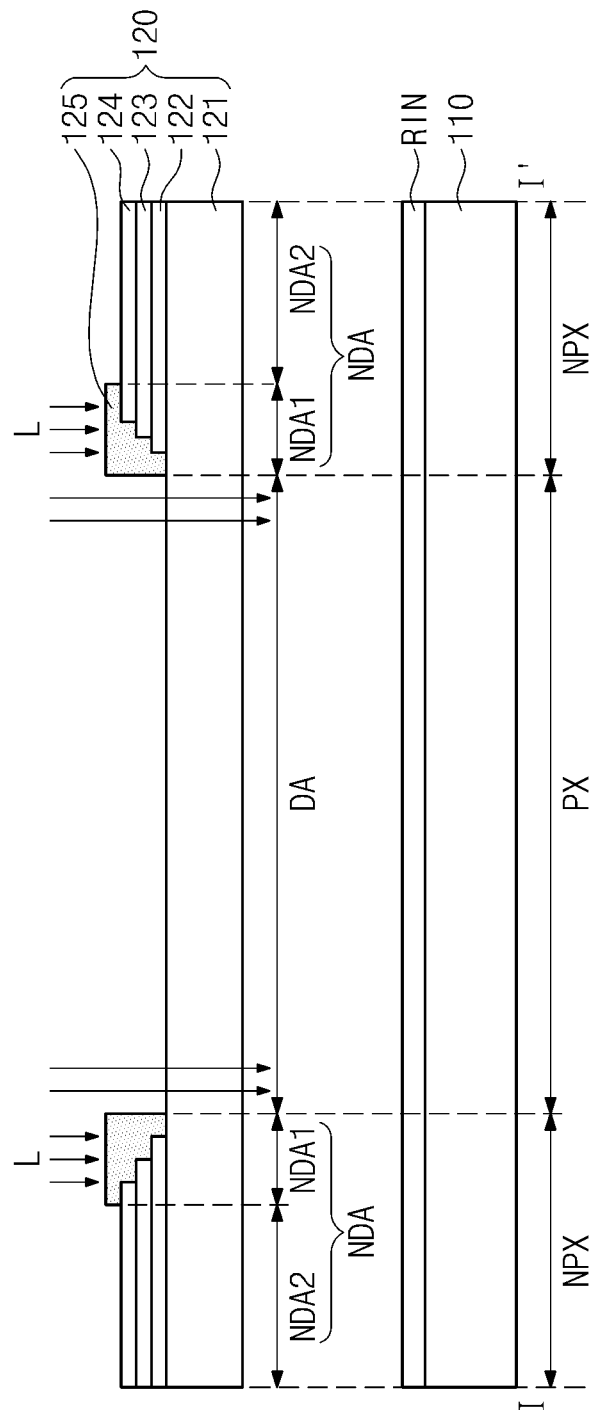

Now referring to FIG. 3E, the display panel 110 is disposed under the window panel 120 and an adhesive member RIN is attached to the upper surface of the display panel 110 at step S140. The adhesive member RIN may be, but not limited to, an ultraviolet ray-curable resin.

Then, at step S150, light L is irradiated onto the window panel 120 from above the window panel 120. The light-blocking printed layer 125 blocks the light L and the window glass 121 transmits the light in the display area DA. Accordingly, the inner surface of the light-blocking printed layer 125 may be clearly recognized as the boundary line BL. That is, the boundary line BL may be clearly recognized by the light-blocking printed layer 125. As shown in FIG. 3E, the pixel area PX of the display panel 110 may be arranged to geometrically correspond to the display area DA of the window panel 120 by using the boundary line BL at step S160. In other words, the pixel area PX of the display panel 110 and the display area DA of the window panel 120 may be precisely aligned to each other.

Figure 3F:
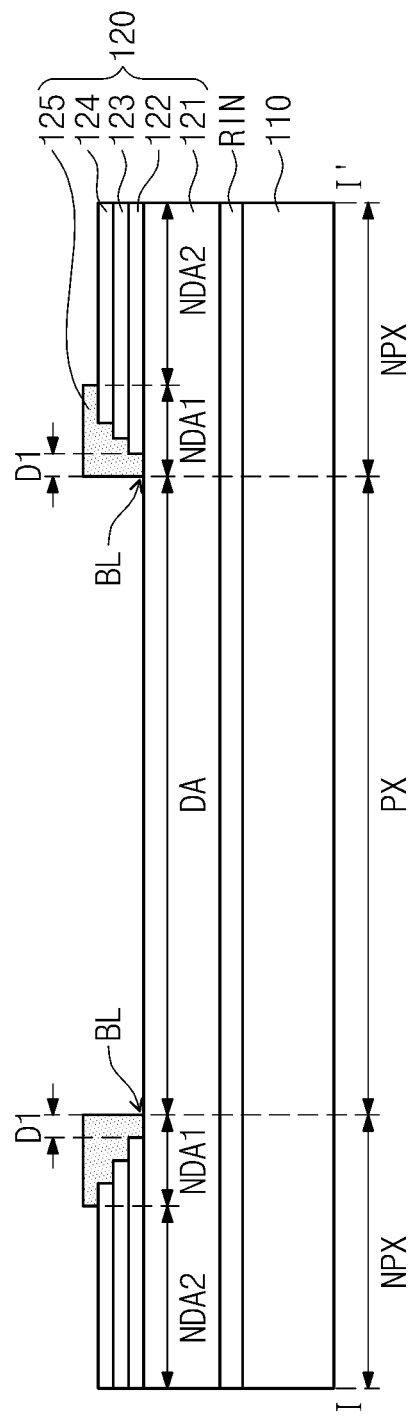
Figure 3G:
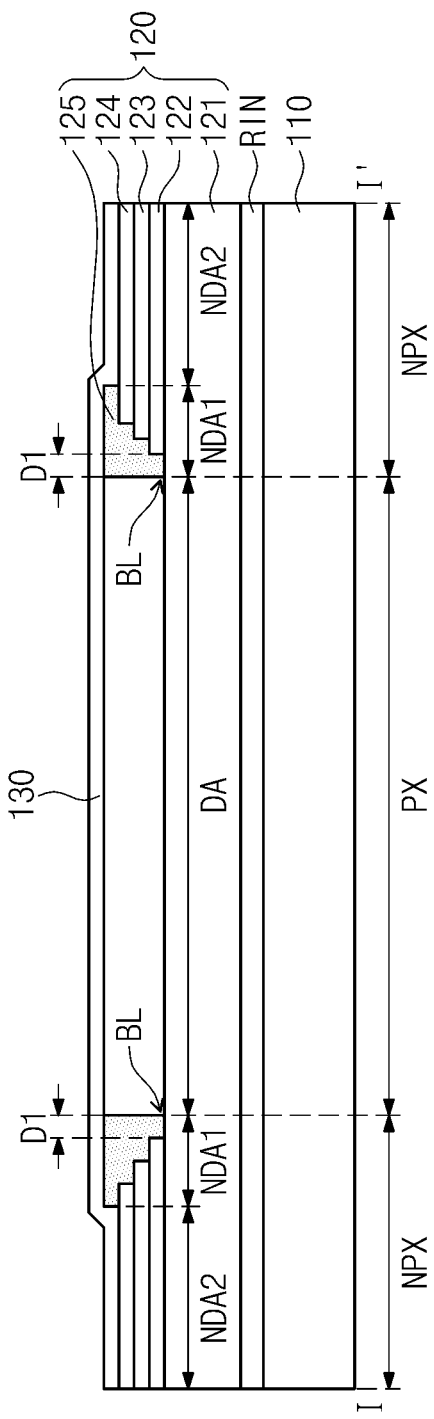

Referring to FIGS. 3F and 3G, the display panel 110 and the window panel 120 are attached to each other by the adhesive member RIN at step S170. Although not shown in figures, the adhesive member RIN may be cured by the ultraviolet ray. The protective film 130 is attached onto the window panel 120.

In the present exemplary embodiment, the light-blocking printed layer 125 of the display device 100 is disposed on the window glass 121 and the first, second, and third decoration printed layers 122, 123, and 124 to cover the first, second, and third decoration printed layers 122, 123, and 124 in the first non-display area NDA1 and has the black color. The light-blocking printed layer 125 having the black color has the light blocking ratio higher than that of the first, second, and third decoration printed layers 122, 123, and 124. Due to the above-mentioned configuration, the inner surface of the light-blocking printed layer 125 may be clearly displayed as the boundary line BL.

Consequently, the display device 100 according to the present exemplary embodiment may provide an improved boundary recognition ability and minimize a boundary recognition error between the display area DA and the non-display area NDA.

FIG. 4 is a cross-sectional view showing a window panel of a display device according to another exemplary embodiment of the present invention.

A window panel 220 shown in FIG. 4 has the same configuration as the window panel 120 shown in FIG. 2 except that decoration printed layers 222, 223, and 224 have different color from that of the decoration printed layers 122, 123, and 124. Hereinafter, accordingly, different elements of the window panel 220 from those of the window panel 120 shown in FIG. 2 will be described in detail.

Referring to FIG. 4, a first decoration printed layer 222 is formed of a transparent printed layer. That is, the first decoration printed layer 222 has a transparent color. The first decoration printed layer 222 may include a pearl pigment that glitters. That is, the first decoration printed layer 222 may include the pearl pigment to provide a glittering visual effect to the viewer in the second non-display area NDA2.

The second and third decoration printed layers 223 and 224 have different color from that of the first decoration printed layer 222. The second and third decoration printed layers 223 and 224 may have the same color except for the black color. That is, the color of the first decoration printed layer 222 may be different from the color of the second and third decoration printed layers 223 and 224.

A light-blocking printed layer 225 is formed on a window glass 221 and the first, second, and third decoration printed layers 222, 223, and 224 to cover the first, second, and third decoration printed layers 222, 223, and 224 in the first non-display area NDA1 and has the black color. The light-blocking printed layer 225 having the black color has the light blocking ratio higher than that of the first, second, and third decoration printed layers 222, 223, and 224. Due to the above-mentioned configuration, the inner surface of the light-blocking printed layer 225 may be clearly displayed as the boundary line BL.

Consequently, the display device according to the present exemplary embodiment may provide an improved boundary recognition ability and minimize a boundary recognition error between the display area DA and the non-display area NDA.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device, comprising:
   a window panel that includes:
      a display area, and
      a non-display area including:
         a first non-display area surrounding the display area and
         a second non-display area surrounding the first non-display area; and
   a display panel that includes:
      a pixel area generating an image to be displayed in the display area and
      a non-pixel area surrounding the pixel area,
   the window panel comprising:
      a window glass disposed on the display panel;
      a plurality of decoration printed layers disposed on the window glass in a portion of the first non-display area and an entirety of the second non-display area; and
      a light-blocking alignment layer consisting of a black color, disposed on the window glass and the decoration printed layers and formed between the display area and the second non-display area to contact each of the decoration printed layers in the first non-display area and to provide a boundary line corresponding to a boundary between the display area and the first non-display area,
      wherein the light-blocking alignment layer does not extend into the second non-display area such that an outermost layer of the plurality of decoration printed layers in the second non-display area is exposed.

2. A method of manufacturing a display device, comprising:
   preparing a window glass including a display area and a non-display area, the non-display area including a first non-display area surrounding the display area and a second non-display area surrounding the first non-display area;
   forming a plurality of decoration printed layers on the window glass in a portion of the first non-display area and an entirety of the second non-display area;
   forming a light-blocking alignment layer, which consists of a black color, on the window glass and the decoration printed layers and between the display area and the second non-display area to contact each of the decoration printed layers in the first non-display area to provide a boundary line corresponding to a boundary between the display area and the first non-display area, the light-blocking alignment layer not being formed in the second non-display area such that an outermost layer of the plurality of decoration printed layers in the second non-display area is exposed;
   disposing a display panel under the window glass, the display panel including a pixel area generating an image to be displayed in the display area and a non-pixel area surrounding an outer peripheral edge of the pixel area;
   aligning the boundary line of the window glass, which corresponds to an inner edge of the light-blocking alignment layer, to the outer peripheral edge of the pixel area of the display panel by irradiating an external light onto the window glass and recognizing the boundary line that corresponds to the inner edge of the light-blocking alignment layer and is defined as the boundary between the display area and the non-display area;
   and
   attaching the display panel and the window glass to each other using an adhesive member.

3. A display device, comprising:
   a window panel that includes:
      a display area; and
      a non-display area, including:
         a first non-display area surrounding the display area; and a second non-display area surrounding the first non-display area; and
a display panel that includes:
a pixel area generating an image to be displayed in the display area and
a non-pixel area surrounding the pixel area,
the window panel, comprising:
a window glass disposed on the display panel;
a plurality of decoration printed layers disposed on the window glass in a portion of the first non-display area and an entirety of the second non-display area, and spaced apart from the display panel by the window glass; and
a light-blocking alignment layer consisting of black color, disposed only on the window glass and on the decoration printed layers formed thereon and being arranged only in between the display area and the second non-display area and contacting each of the decoration printed layers in the first non-display area, the light-blocking alignment layer to provide a boundary line corresponding to a boundary between the display area and the first non-display area upon being illuminated by external light and upon the window glass being aligned with the display panel, the light-blocking alignment layer to leave an outermost layer of the plurality of decoration printed layers in the second non-display area exposed.

4. The display device of claim 1, wherein the decoration printed layers comprise:
a first decoration printed layer disposed on the window glass;
a second decoration printed layer disposed on the first decoration printed layer; and
a third decoration printed layer disposed on the second decoration printed layer, and the first decoration printed layer is spaced apart from the boundary line by a predetermined distance and disposed on the window glass in the portion of the first non-display area and in the entirety of the second non-display area.

5. The display device of claim 1, wherein an inner edge of the decoration printed layers is spaced-apart from the boundary line by a predetermined distance.

6. The display device of claim 1, wherein portions of each of the decoration printed layers corresponding to the second non-display area are not overlapped by the black light blocking alignment layer.

7. The display device of claim 1, wherein the decoration printed layers and the light-blocking alignment layer are each comprised of an organic material.

8. The display device of claim 1, the light-blocking alignment layer being arranged only in the first non-display area and not in any of the display area or the second non-display area, the light blocking alignment layer being a single integrated monolithic unit.

9. The display device of claim 1, wherein portions of the decoration printed layers within the second non-display area are visible to an external viewer and are not overlapped by the black light blocking alignment layer.

10. The method of claim 2, wherein the forming of the decoration printed layers comprises:

forming a first decoration printed layer on the window glass;
forming a second decoration printed layer on the first decoration printed layer;
forming a third decoration printed layer on the second decoration printed layer, and the first decoration printed layer is spaced apart from the boundary line by a predetermined distance and formed on the window glass in the portion of the first non-display area and the entirety of the second non-display area.

11. The method of claim 10, wherein the first decoration printed layer is spaced-apart from the boundary line by a predetermined distance.

12. The method of claim 2, wherein each of the plurality of decoration printed layers has a color different from the black color of the light-blocking alignment layer.

13. The display device of claim 3, wherein the decoration printed layers and the light-blocking alignment layer are each comprised of an organic material, the light blocking alignment layer not being interposed between the display panel and the decoration printed layers.

14. The display device of claim 3, wherein light blocking alignment layer is a single integrated monolithic unit that is spaced-apart from the display panel by at least the window glass.

15. The display device of claim 4, wherein, in a direction parallel to a surface of the window glass, a width of the first decoration printed layer is larger than a width of the second decoration printed layer, and the width of the second decoration printed layer is larger than a width of the third decoration printed layer.

16. The display device of claim 4, wherein the first decoration printed layer comprises a pearl pigment that glitters and has a transparent color, and the second and third decoration printed layers have a color different from the color of the first decoration printed layer, and the color of the second and third decoration printed layers being different from the black color of the light-blocking alignment layer, wherein portions of the first, second and third decoration printed layers arranged within the second non-display area being visible to an external viewer and are not overlapped by the light blocking alignment layer.

17. The method of claim 10, wherein the first, second, and third decoration printed layers have a color different from the black color of the light-blocking alignment layer.

18. The method of claim 10, wherein the first decoration printed layer comprises a pearl pigment that glitters and has a transparent color, and the second and third decoration printed layers have a color different from the color of the first decoration printed layer and the color of the second and third decoration printed layers being different from the black color of the light-blocking alignment layer.

19. The display device of claim 15, wherein an inner edge of the first decoration printed layer is disposed to be closer to the display area than an inner edge of the second decoration printed layer, and the inner edge of the second decoration printed layer is disposed to be closer to the display area than an inner edge of the third decoration printed layer.

* * * * *